July 17, 1934. H. H. CLAYBAKER 1,966,710
HAYRACK
Filed July 11, 1932 2 Sheets-Sheet 1
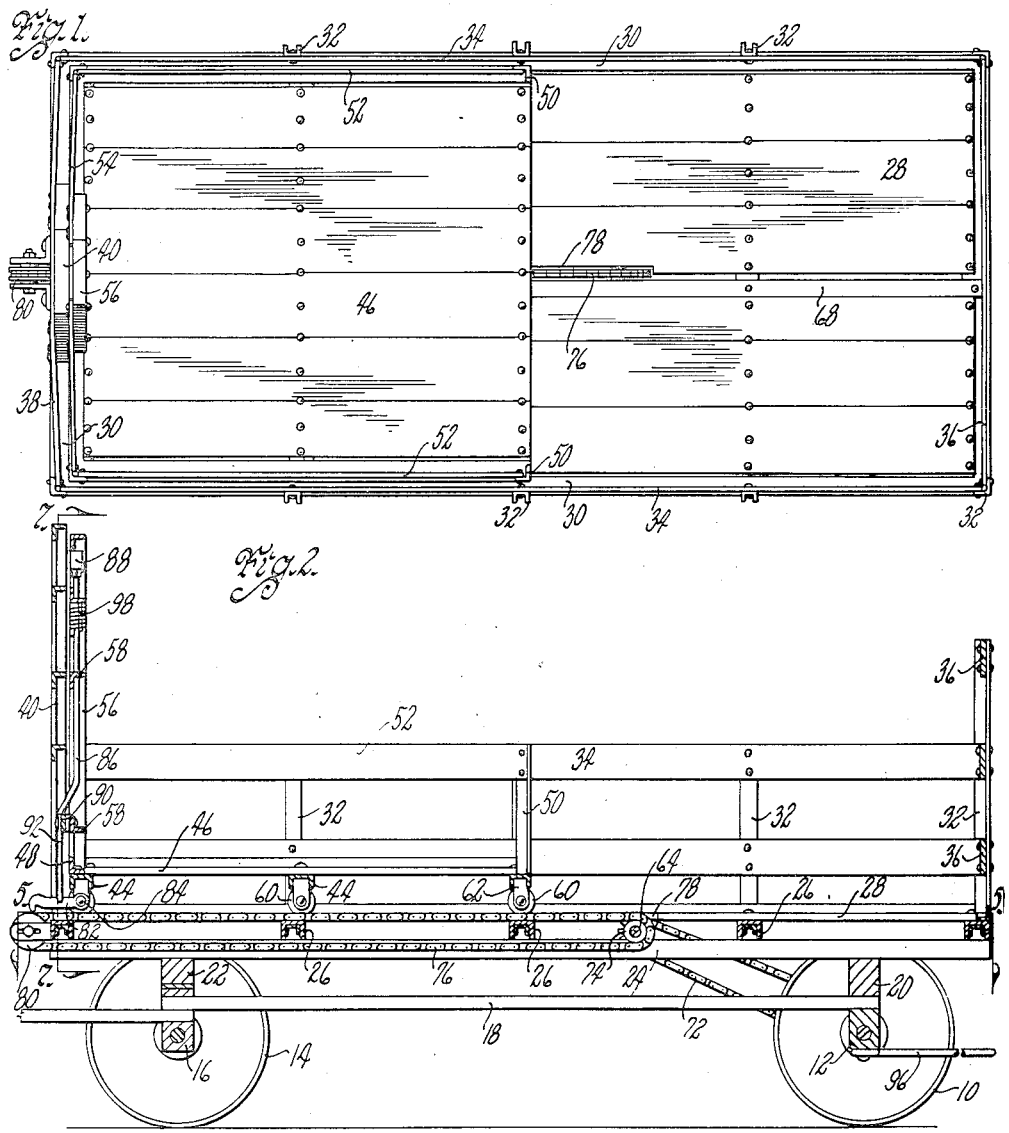
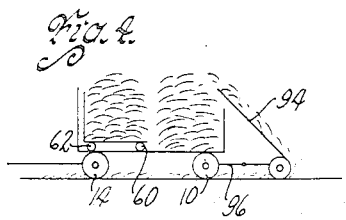
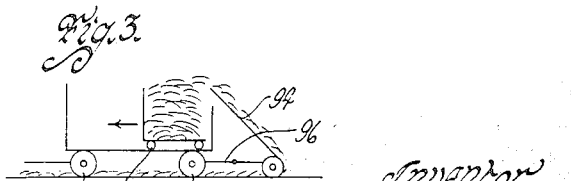
Inventor
Howard H. Claybaker
by Bair, Freeman & Sinclair
Attorneys
Witness
Edw. Seely July 17, 1934.  H. H. CLAYBAKER  1,966,710
HAYRACK
Filed July 11, 1932   2 Sheets-Sheet 2
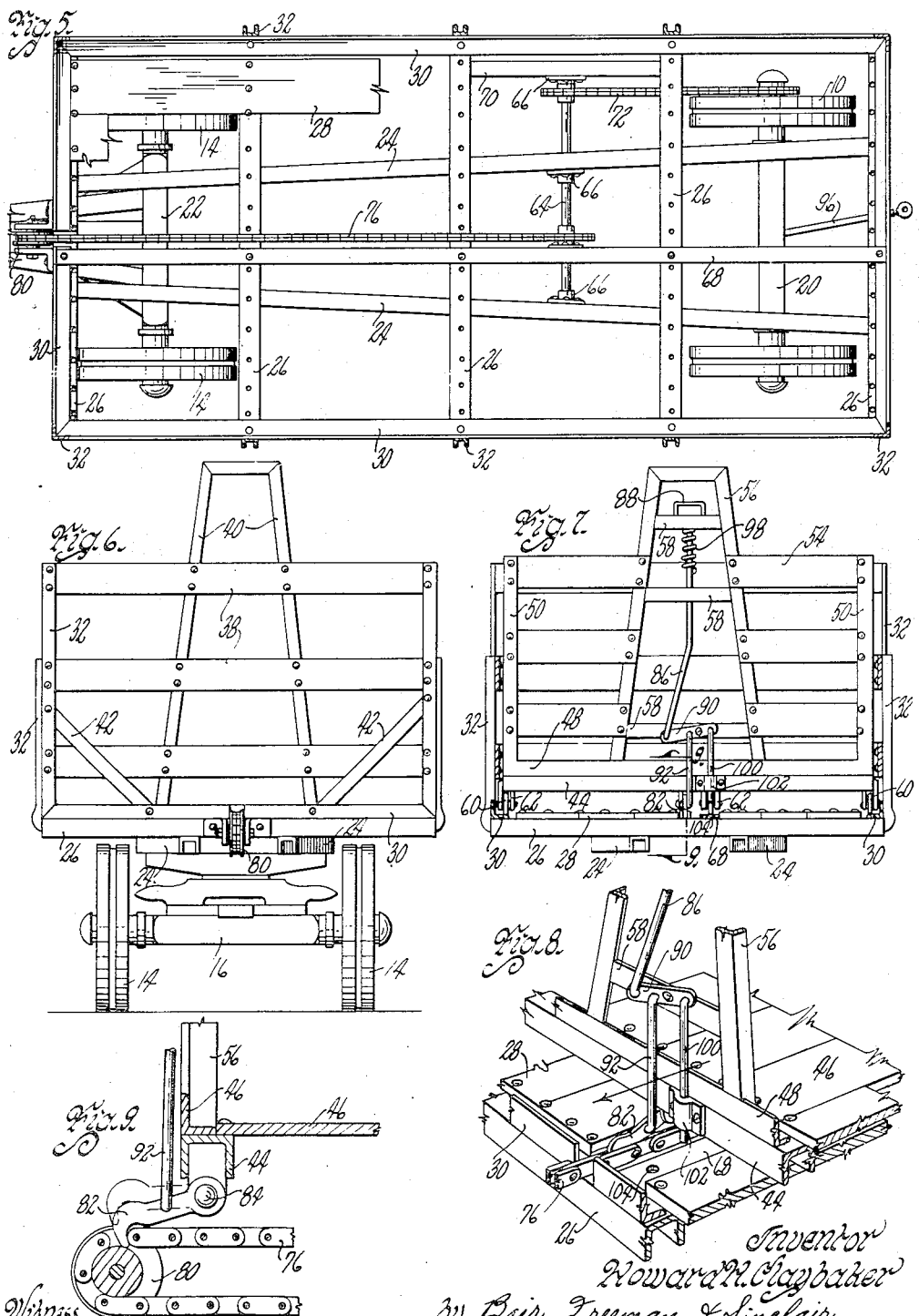

Patented July 17, 1934

1,966,710

UNITED STATES PATENT OFFICE 1,966,710

HAYRACK

Howard H. Claybaker, Clarinda, Iowa

Application July 11, 1932, Serial No. 621,827

2 Claims. (Cl. 214—81.5)

The object of this invention is to provide an improved construction for a hayrack having a main body portion extending the full length of the device and a supplementary portion which may be positioned on the rear of the body for loading it and then may be moved forwardly to a position where it occupies the forward half of the rack, after which the rearward half may be loaded, thus saving time and labor in the handling of the material which is loaded upon the rack.

A further object of the invention is to provide improved means for moving a supplemental rack member relative to the main body of the rack by power generated by the forward movement of a vehicle on which the rack is mounted, or of which it forms a part.

Still another object is to provide improved control means for connecting for supplemental rack to the traveling operating members and also for latching the supplemental rack in either of its positions.

Another object of the invention is to provide a hayrack which is of especially strong and durable construction.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a plan view of a hayrack embodying my improvements, the supplemental rack being shown at the forward end of the main rack.

Figure 2 is a longitudinal section of the same.

Figures 3 and 4 are diagrammatic views showing the device in use and illustrating respectively the two positions of the supplemental rack.

Figure 5 is a horizontal section on the line 5—5 of Figure 2, illustrating particularly the running gears, the bed of the main rack, and the operating connections from one of the drive wheels of the wagon.

Figure 6 is a front view of the rack.

Figure 7 is a vertical section on the line 7—7 of Figure 2, illustrating particularly the supplemental rack in front elevation and also the control means.

Figure 8 is a perspective view partly in section illustrating portions of the device and a part of the control means.

Figure 9 is a detail longitudinal section on the line 9—9 of Figure 7, illustrating the operating connections between the control means and the operating means for the supplemental rack.

My improved hayrack is here shown as being mounted upon a vehicle or wagon running gear having a rear truck including rear wheels 10 rotatably mounted on an axle 12 and a forward truck having wheels 14 rotatably mounted on an axle 16, the axles being connected by a reach 18 in the usual manner. The axles support bolsters 20 and 22 on which the hayrack proper is mounted.

The main part or body of the rack includes a pair of sills 24 suitably spaced apart and resting on the bolsters, these sills preferably being formed of channel beams opening downwardly. The sills 24 support a series of cross bars 26 which also are preferably composed of channel beams opening downwardly and on these cross bars is mounted a floor 28 preferably substantially solid and composed of boards arranged longitudinally. The cross arms 26 also support a horizontal rectangular frame 30 composed of angle irons and forming the outline of the body of the rack.

Fixed to and rising above the horizontal frame 30 is an enclosure composed of channel iron posts 32 connected along the sides of the rack by spaced boards 34, along the rear of the rack by spaced boards 36 and along the front of the rack by spaced boards 38; these elements going to make up a skeleton enclosure sometimes known as a "basket" rack. The rear end of the enclosure preferably is somewhat higher than the side walls and the front wall is still higher than the rear and includes a standard 40 rising above the level of the forward wall. The corner posts of the structure may be supplied with inclined braces 42 further connecting them to the horizontal frame 30.

I also employ a supplemental rack which is mounted within and movable relative to the main rack just described, the supplemental rack being of slightly less width and of substantially one-half the length of the main rack or body portion of the device.

The supplemental rack includes a plurality of cross bars 44 preferably formed of channel beams, these bars supporting a floor 46 and also a metallic frame 48 formed of angle bars, extending along the sides and across the front of the supplemental rack.

The supplemental rack also includes an enclosure extending above the floor 46 and composed of posts 50 fixed to the frame 48 and connected along the sides of the rack by slats 52 and along the front by slats 54, the rear end of the supplemental rack being open. The front end of the supplemental rack also includes a standard 56 of substantially A shape and having cross bars 58 composed of angle iron bars.

The supplemental rack is movable longitudinally of and within the main rack, and to that end is provided rollers 60, mounted in brackets 62, and adapted to travel on the side members of the frame 30 of the body, which side members serve as tracks for said roller.

Operative devices are provided for moving the supplemental rack forwardly in the main rack, these operative devices being driven from the running gear of the wagon and being arranged to travel constantly during travel of the wagon.

A jack shaft 64 is mounted transversely of an intermediate portion of the device and is journaled in bearings 66 carried by the sills 24 and by other portions of the frame including a longitudinal center stringer 68 which rests on and is secured to the cross arms 26 and a frame member 70 mounted between end portions of two of said cross arms.

The jack shaft 64 is connected by sprocket gearing 72 to the hub of one of the rear wheels 10, whereby said shaft is rotated during travel of the vehicle. The jack shaft 64 is also equipped with sprocket connections including a gear 74 fixed to the central part of said shaft. The gear 74 is engaged by a sprocket chain 76 which extends forwardly along the center part of the rack and in a longitudinal slot 78 in the floor 28. The forward end of the chain 76 engages over a smooth grooved pulley 80 journaled in a bracket 82 carried by the forward end of the frame of the main rack.

A dog 82 is pivoted at 84 on the central forward portion of the supplemental rack and is adapted to engage between or within links of the sprocket chain 76 to form an operative connection by which said supplemental rack may be moved forwardly on the main rack.

Control devices are provided including a push rod 86 slidably mounted in the forward part of the supplemental rack as by extending slidably through certain of the cross bars 58 of the standard 56, said control rod being formed with a loop handle 88 at its upper end.

The lower end of the control rod 86 is pivoted to one end of a lever 90 fulcrumed between its ends on the lower part of the standard 56 at the center of the supplemental rack and a link 92 is provided which forms a pivotal connection between said lever and the dog 82, the arrangement being such that when the control rod is moved downwardly it swings the lever 90 on its pivot and pushes downwardly on the link 92, thereby moving the dog 82 into engagement with the sprocket chain 76.

In operation the supplemental rack is placed at the rear end of the main rack, this being accomplished by pushing or pulling it to the desired location manually.

The rack is designed to be used in connection with a hay loader indicated conventionally at 94 in Figures 3 and 4 and adapted to be attached to a draw bar 96 carried by the rear axle of the vehicle.

The vehicle is moved forwardly and the loader 94 serves to deposit hay or similar substance in the supplemental rack which is located at the rear of the vehicle as illustrated in Figure 3.

When the supplemental rack has been loaded the driver or operator pushes downwardly on the control rod 86, causing the dog 82 to engage in the chain 76 as illustrated in Figure 9. A retractile spring 98 is fixed at one end to the control rod 86 and at the other end to a stop member such as one of the cross bars 58. It is the function of the spring 98 to exert an upward pull on the control rod 86 and to pull it upwardly so that the dog 82 is entirely freed from the chain 76 after its contact with the pulley 80 has started it out of such engagement. It will be understood that when the dog is engaged with the chain by a downward push on the control rod, the load involved in the supplemental rack and its contents will cause enough frictional contact to keep the dog in engagement until it has been pushed out by contact with the pulley.

Means may also be provided for latching the supplemental rack in either of its positions. For this purpose I have provided a latch rod 100 which is pivotally connected to the lever 90 at the end opposite to the connection of the control rod 86. The latch rod 100 is slidably mounted in a bearing 102 carried by the frame of the supplemental rack and is adapted to have its lower end engaged in one or another of two socket openings 104 formed in the floor 28 of the main rack, at such positions as to be engaged when the hay rack is either at its rearward or its forward position.

Inasmuch as the latch rod 100 is on the opposite side of the pivot of the lever from the control rod and link 92, it is clear that said latch rod will be moved downwardly to engaging position when the control rod and link are moved upwardly and also that it will be released from engagement with either socket when the control rod and dog are moved downwardly for affording a connection with the operative devices including the chain 76. In other words—the latch rod will be in engagement when the dog is disengaged and vice versa.

This device is very convenient for use in the operation of loading hay, particularly when a hay loader is used, because it saves much time and labor in the handling of hay which ordinarily would have to be thrown forward from the rear end of the rack where it is deposited by the loader. Furthermore, the operating connections serve to afford a means for automatically moving the loaded supplemental rack forward on the main rack and for causing a disengagement of such connections when it reaches its forward position.

By using this device with movable supplemental rack the load is placed on the rack in two separate masses, thus making it easier to remove the load particularly when a hay fork is employed.

If at any time it is desired to use the rack without the supplemental rack, the supplemental member may be removed by simply lifting it from its position on the main rack.

The rack, being made in the main of structural steel, is very sturdy and durable and capable of holding large loads of hay or the like.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. A hay rack comprising running gears, a main body portion mounted thereon, a supplemental rack of less length than the body portion and mounted for movement longitudinally thereof, a jack shaft journaled transversely of the body portion, sprocket gearing between the running gears and said jackshaft for driving the latter while the vehicle is moving, a sprocket chain extending longitudinally of the body portion and driven from said jack shaft, a dog pivoted on the supplemental rack and adapted to engage said sprocket chain at times, a lever pivoted on said supplemental rack, a control rod pivotally connected to said lever and arranged for sliding movement in said rack, a link pivotally connecting said lever to said dog, and a latch rod also pivoted to said lever and adapted to be simultaneously moved thereby in the opposite direction from said link and dog, said latch rod adapted to engage a part on the body portion for holding the supplemental rack against movement.

2. A hayrack comprising running gears, a main body portion mounted thereon, a supplemental rack of less length than the body portion and mounted for movement longitudinally thereof, a chain extending longitudinally of the body portion and driven from said running gears, a dog pivoted on the supplemental rack and adapted to engage said chain at times and a latch rod carried by said supplemental rack and adapted to be simultaneously moved to engage a part on the body portion for holding the supplemental rack against movement when the dog is moved to disengaging position with respect to said chain and vice versa.

HOWARD H. CLAYBAKER.